Dec. 29, 1953

V. PALAZZOLO 2,663,932

AUTOMATIC INDIVIDUAL BUTTER SERVER

Filed Aug. 31, 1951

INVENTOR.
Vincent Palazzolo,
BY Victor J. Evans & Co.
ATTORNEYS

Dec. 29, 1953 V. PALAZZOLO 2,663,932
AUTOMATIC INDIVIDUAL BUTTER SERVER
Filed Aug. 31, 1951 3 Sheets-Sheet 2
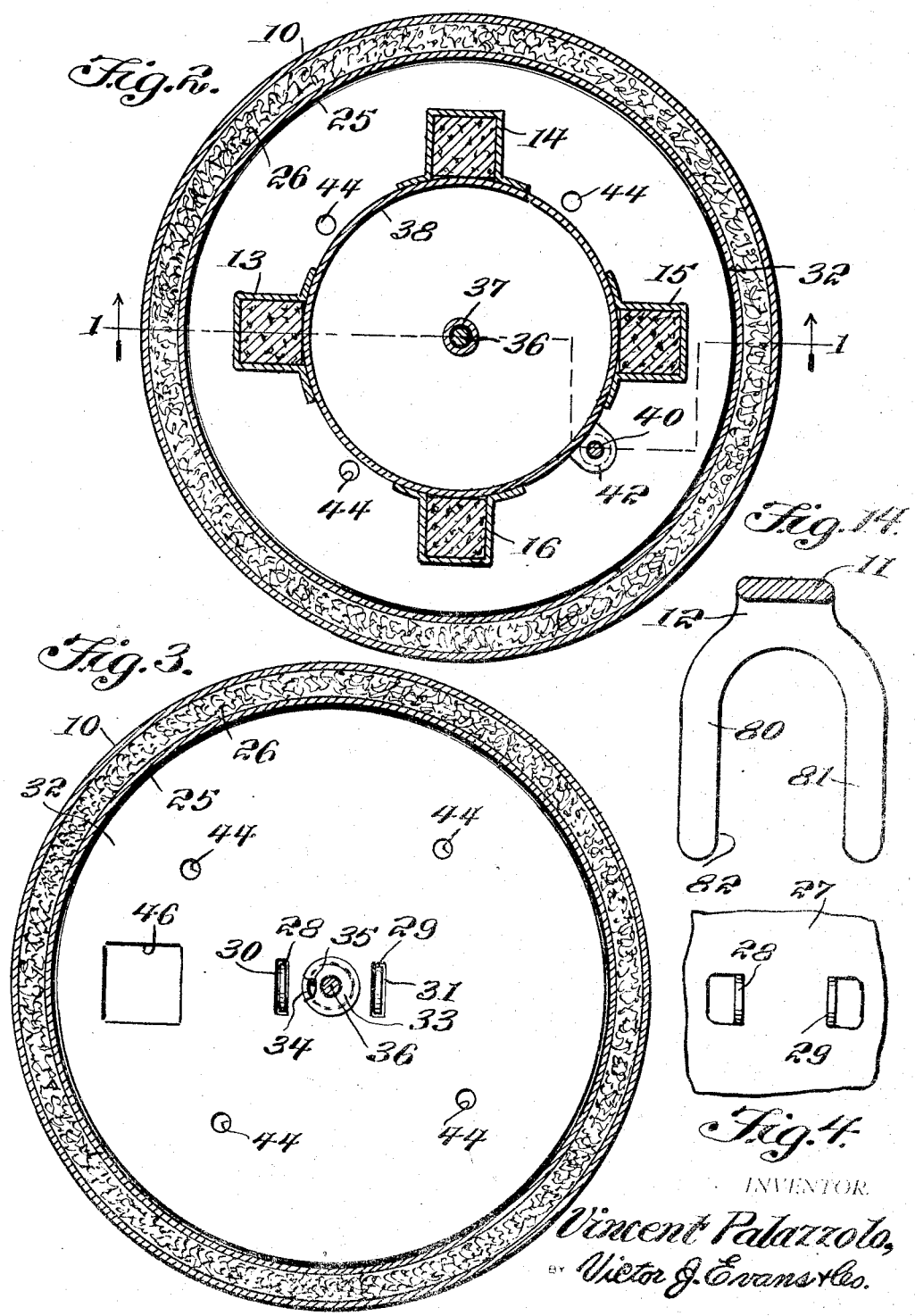

Dec. 29, 1953
V. PALAZZOLO
2,663,932
AUTOMATIC INDIVIDUAL BUTTER SERVER
Filed Aug. 31, 1951
3 Sheets-Sheet 3
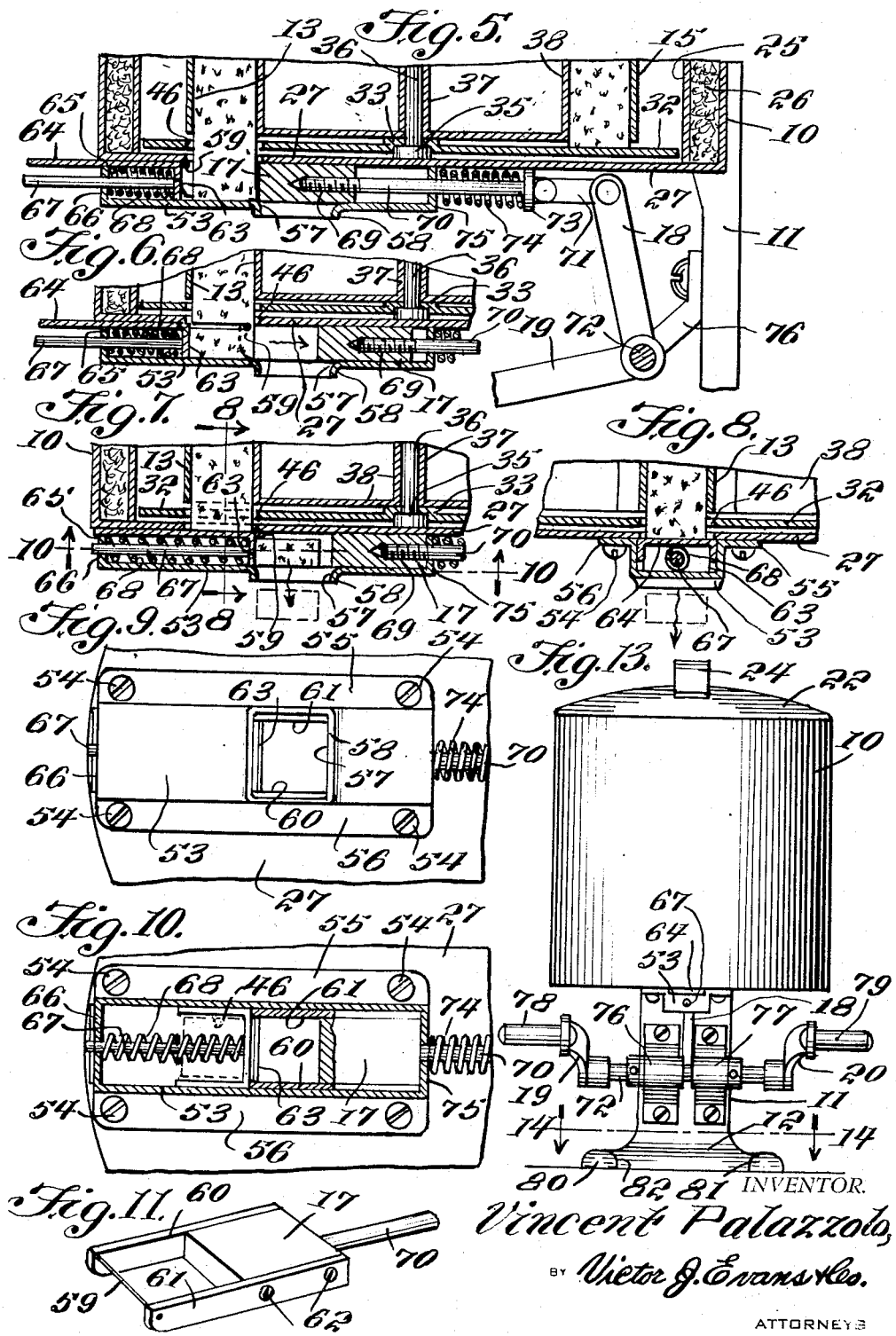

Patented Dec. 29, 1953

2,663,932

UNITED STATES PATENT OFFICE 2,663,932

AUTOMATIC INDIVIDUAL BUTTER SERVER

Vincent Palazzolo, St. Louis, Mo.

Application August 31, 1951, Serial No. 244,597

4 Claims. (Cl. 31—21)

This machine relates to butter cutting and serving devices of the type used to cut elongated butter sticks into squares and in particular a machine having a plurality of vertically disposed butter stick holding channels with a lever actuated slider at the lower end wherein as the slider is operated a square of butter is cut from a butter stick and dropped through an opening in the base of the machine.

The purpose of this invention is to provide an individual butter serving machine in which the machine may be set to cut squares of different thicknesses such as 16, 18, or 20 pieces to the quarter of a pound and wherein the butter is cut while it is chilled so that substantially all waste is eliminated.

Various devices have been provided for cutting butter into squares, however, it is difficult to cut the butter while it is still chilled and consequently there is considerable waste. With this thought in mind this invention contemplates a butter square cutting machine having a plurality of butter retaining channels mounted in an insulating casing and having an ice compartment for retaining the butter firm and also having a slicing slider for cutting squares from the lower ends of sticks of butter positioned in said channels.

The object of this invention is, therefore, to provide means for forming a butter square cutting machine whereby butter is cut into squares from sticks while the butter is cold and wherein the squares are cut only as desired.

Another object of the invention is to provide a butter square cutting machine in which the body of the machine in which the sticks of butter are retained may be removed and placed in a refrigerator.

A further object of the invention is to provide an improved butter square cutting machine which is of a simple and economical construction.

With these and other objects and advantages in view the invention embodies a casing having an insulated wall with spaced vertically positioned butter stick retaining channels therein, an ice compartment in the center, a base for supporting the casing and lever actuated slider having a cutter thereon mounted on the base and positioned to receive the lower ends of sticks of butter in the said channels.

Other features and advantages of the invention will appear from the following description taken in connection with the drawing, wherein:

Figure 2 is a sectional plan through the casing taken on line 2—2 of Figure 1.

Figure 3 is a similar sectional plan through the casing taken on line 3—3 of Figure 1.

Figure 4 is an enlarged detail showing a pair of fingers stamped from the base and positioned to extend upwardly into slots in the lower end of the casing.

Figure 5 is a vertical section through the intermediate part of the butter cutter with upper and lower parts broken away and showing the slider in the position wherein the lower end of the butter stick has moved downwardly into the cutting position.

Figure 6 is a similar section showing a square partly cut from the lower end of the butter stick.

Figure 7 is a similar section showing the square removed from the butter stick and also indicating a butter square dropped from the cutting device in dotted lines.

Figure 8 is a section through the butter cutting element of the device taken on line 8—8 of Figure 7.

Figure 9 is a view looking upwardly toward the lower side of the slider mounting.

Figure 10 is a sectional view taken on line 10—10 of Figure 7 also looking upwardly and illustrating the slider.

Figure 11 is an enlarged detail showing the butter cutting slider.

Figure 12 is a detail showing the upper end of one of the butter stick holding channels and illustrating the mounting of the pivotally mounted cap or closure on the upper ends of the channels.

Figure 13 is a front elevational view illustrating the butter square cutting machine on a smaller scale.

Figure 14 is a detail showing a section taken on line 14—14 of Figure 13 illustrating the shape of the foot or base of the machine.

Figure 1:
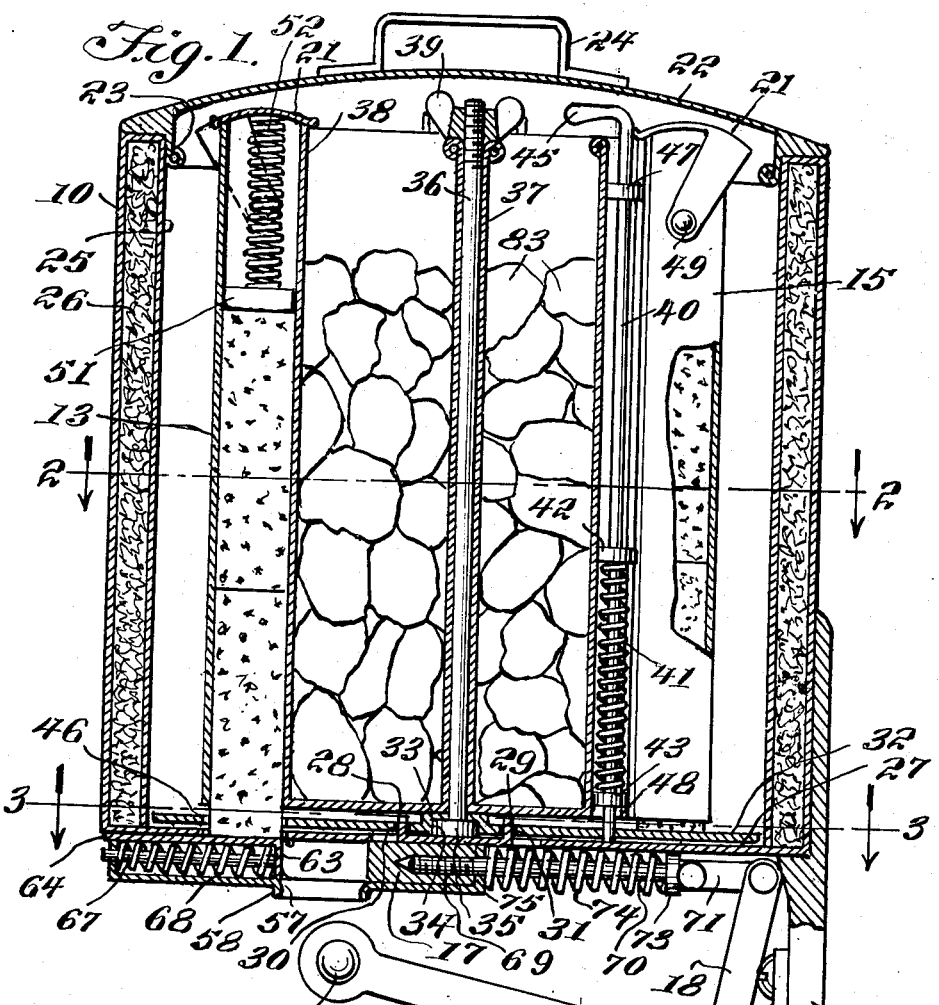
Figure 1 is a vertical section through the machine with parts broken away, showing the butter cutting and dispensing slider in the released position wherein the lower end of a butter stick as shown in one of the channels is retained in the ice chilled section of the casing.
Figure 1A:
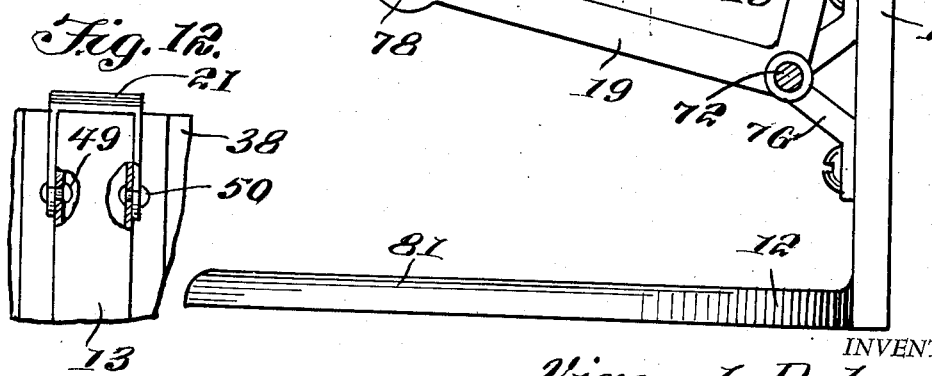

Referring now to the drawings wherein like reference characters denote corresponding parts the improved butter square cutting machine of this invention includes a casing 10 mounted on a base 11 and having a foot 12, butter stick holding channels 13, 14, 15 and 16 positioned in the casing, a slider 17 operated by an arm 18 which is actuated by hand levers 19 and 20, caps 21 positioned on the upper ends of the channels, and a cover 22 positioned on the upper end of the casing and having an inner annular flange 23 and a handle 24.

The casing 10 is provided with an inner wall 25 that is spaced from the outer wall and the area between the walls is filled with insulation 26.

The lower end of the casing is provided with a base plate 27 from which fingers 28 and 29 are struck and, as illustrated in Figures 1, 3, and 4, the fingers 28 and 29 extend upwardly through slots 30 and 31, respectively, of an inner plate 32 which is freely positioned on the base plate 27.

The inner plate 32 is provided with an elevated section 33 having a recess 34 in the lower surface and a head 35 of a bolt 36 is positioned in the recess. The bolt extends upwardly through a tube 37 of a magazine or inner cylinder 38 and the magazine or inner cylinder is retained in position on the plate 32 by a thumb nut 39, threaded on the upper end of a bolt 36.

The inner cylinder 38 is also provided with a spring pin 40 having a spring 41 thereon and with the spring positioned between a collar 42, fixedly mounted on the cylinder and a collar 43 mounted on the pin. The pin 40 is resiliently urged downwardly and with the lower end extended into one of the openings 44 in the plate 32. The pin 40 is provided with a handle 45 at the upper end by which it may be elevated to change the position of the magazine or inner cylinder and by this means the inner cylinder is set whereby one of the butter holding channels 13, 14, 15 or 16 is in registering relation with an opening 46 in the plate 32 through which the butter stick passes into the open section of the slider 17, and to the position shown in Figure 5. The upper end of the pin 40 is retained in position with a collar 47, similar to the collar 42 and a similar collar 48 is provided at the lower end.

The butter stick holding channels 13, 14, 15 and 16 are mounted on the outer surface of the cylinder 38, as shown in Figure 2 and by this means the channels are positioned to register with the opening 46 through which the lower ends of the butter sticks pass for slicing.

The caps 21 are pivotally mounted on the upper ends of the channels with rivets 49 and 50, as shown in Figure 12 and with the arcuate formation of the caps and upper ends of the channels the caps readily swing from one position to another. The channels are provided with weights 51 that are resiliently urged downwardly by springs 52 and, as shown in Figure 1 the upper ends of the springs are held by the caps.

The slider 17 is positioned to travel in a trough 53 that is secured to the under surface of the base 27 of the casing with screws 54 that extend through flanges 55 and 56. The lower surface of the trough 53 is provided with an opening 57 and a bead 58 extends continuously around the opening.

The slider 17 is formed as illustrated in Figure 11 wherein a wire or cutting knife 59 is suspended between the ends of side plates 60 and 61 and the side plates are secured to the block or base of the slider by screws 62. The extension of the side plates 60 and 61 and the knife 59 provide an opening to receive the end of a butter stick.

The trough is also provided with a follower 63 which is formed on the end of a plate 64 and, as shown in Figures 5, 6 and 7 the plate 64 extends through a slot 65 in the end 66 of the trough and through which the rod 67 which extends from the follower 63 passes. The rod or stem 67 is provided with a spring 68 that urges the follower 63 to the position shown in Figure 1 when the slider is in the position of rest.

The slider 17 is provided with an opening 69 in which a rod 70 is threaded and the outer end of the rod is connected by a link 71, to the arm 18 that is connected to the hand levers 19 and 20 through the shaft 72. The rod 70 is provided with a collar 73 and a spring 74 positioned on the rod 70 between the collar 73 and end 75 of the trough 53 urges the slider to the position shown in Figure 1, until the arm is actuated by one of the hand levers 19 or 20.

The shaft 72 upon which the arm 18 and levers 19 and 20 are mounted is journaled in bearings 76 and 77 on the base 11, and the outer ends of the levers 19 and 20 are provided with pins or handles 78 and 79, respectively.

The device is supported by the foot 12 which is formed with extended arms 80 and 81 providing a space 82 in which butter plates and the like may be placed to receive squares of butter cut from the lower ends of the butter sticks.

In the design shown the butter holding channels are shaped to hold two-one-quarter sticks of butter whereby each channel will hold one-half of a pound. It will be understood, however that the channels may be formed of different sizes and may be shaped to accommodate different materials.

It will also be understood that the position of the knife in the slider or the thickness of the slider may be changed whereby the butter squares may be formed of different thicknesses.

With the parts arranged in this manner blocks or sticks of butter are placed in the channels and with ice, as indicated by the numeral 83 in the inner cylinder butter will remain chilled and firm until the squares are cut therefrom. The butter is urged downwardly by the weight 51 and spring 52 and as the butter is used from one channel the inner cylinder is rotated to position another channel over the opening 46.

The cover 22 and also the thumb nut 39 may be removed whereby the inner cylinder with the butter sticks in the channels thereof may be placed in a refrigerator over night or at such time when the device is not in use. The magazine may, therefore, only be positioned in the casing when it is desired to cut individual butter squares from the sticks.

As one of the handles 78 or 79 is pressed downwardly the slider 17 moves from the position shown in Figure 1 to that shown in Figure 5 and the butter stick drops downwardly with the lower end thereof engaging the inner surface of the base of the trough 53. Upon release of the handle the springs 68 and 74 urge the slider and butter square cut by the knife 69 from the position shown in Figure 5 to the position shown in Figure 7, passing through the intermediate position shown in Figure 6. Upon arrival of the butter square to the position shown in Figure 7 the square drops through the opening 57 as indicated by the dotted lines. In this movement the slider is returned to the starting position whereby it is ready for another cycle of operation.

It will be understood that modifications may be made in the design and arrangement of the parts without departing from the spirit of the invention.

What is claimed is:

1. A butter square server comprising a casing having an opening in the lower end, an inner cylinder having vertically disposed butter stick retaining channels secured to the outer surface thereof in relatively spaced relation to each other, and said inner cylinder is positioned in the casing, vertically disposed means fixed at the lower end to said casing for rotatably mounting the inner cylinder in the casing with the channels thereof positioned to selectively register with the opening through the lower end of the casing, a slider slidably mounted on the lower end of the casing and positioned to travel horizontally across the said opening in the lower end thereof, said slider having an opening therethrough positioned to receive an end of a butter stick positioned in one of said butter stick retaining channels, a knife carried by the slider and positioned at one side and at the upper edge of the opening therethrough, means mounted below said casing and connected to said slider for manually actuating the slider to a position for receiving a butter stick, resilient means mounted on said last said means for operating the slider in the opposite direction wherein the knife cuts a butter square from a butter stick extended into the slider, a follower slidably mounted on the bottom of the casing in alinement with said slider and said follower is positioned to coact with the slider to close the opening in the lower end of the casing.

2. A butter square server as described in claim 1 wherein a plate is mounted in the casing intermediate of the lower end of the casing and the lower end of the inner cylinder and the plate are provided with pin receiving openings and a spring pin is mounted on the inner cylinder and positioned to coact with the pin receiving opening in the plate to locate the channels in relation to the openings in the lower end of the casing.

3. A butter server as described in claim 1 wherein the mounting means of the inner cylinder in the casing comprises a bolt having a thumb nut on the upper end so that the inner cylinder with the channels thereon is removable from the casing.

4. A butter square server as described in claim 1 wherein a trough is positioned on the lower end of the casing in communication with the opening in the lower end of the casing and the follower and the slider are positioned in the trough and the trough is provided with an opening offset in relation to the opening in the bottom of the casing and also in which the follower is provided with resilient means for urging the follower to a position to close the opening in the lower end of the casing.

VINCENT PALAZZOLO.

References Cited in the file of this patent

UNITED STATES PATENTS

| Number | Name | Date |
|---|---|---|
| 999,970 | Ebel | Aug. 8, 1911 |
| 1,219,738 | Howard | Mar. 20, 1917 |
| 2,232,749 | Wilson et al. | Feb. 25, 1941 |
| 2,554,953 | Mosier | May 29, 1951 |

FOREIGN PATENTS

| Number | Country | Date |
|---|---|---|
| 79,772 | Germany | Feb. 15, 1895 |